March 9, 1954 S. F. KAPFF 2,671,342
VAPOR PRESSURE DETERMINATION BY EXPANSION COOLING
Filed May 26, 1951

INVENTOR.
SIXT FREDERICK KAPFF
BY
Everett Q. Johnson
ATTORNEY

Patented Mar. 9, 1954

2,671,342

UNITED STATES PATENT OFFICE 2,671,342

VAPOR PRESSURE DETERMINATION BY EXPANSION COOLING

Sixt Frederick Kapff, Homewood, Ill., assignor to Standard Oil Company, Chicago, Ill., a corporation of Indiana Application May 26, 1951, Serial No. 228,515

10 Claims. (Cl. 73—53)

This invention relates to an improved method and apparatus for determining the vapor pressure of a liquid such as gasoline. It has particular reference to an apparatus for automatically indicating and recording the vapor pressure of commercial gasoline mixtures.

In the marketing of petroleum fuels, and particularly gasolines which are produced by blending a number of hydrocarbon fractions, an accurate knowledge of the vapor pressure is essential. For example, it has been found that according to the seasons of the year a certain volatility in gasoline is required, since too high a volatility can lead to vapor lock and too low a volatility makes for hard starting. Furthermore, the different economic values of the blending stocks which make up the gasoline place a premium on accurate blending which achieves the correct volatility but at the same time utilizes the heavy and light constituents most economically.

As is well known, the vapor pressure of blended fuels can be determined by withdrawing a batch sample from a pipe line or reservoir and thereafter measuring the pressure exerted by the vapor of the liquid at a controlled constant temperature. Conventionally, vapor pressures of petroleum products are measured by the so-called "standard Reid test" as described in the ASTM Code D 323–43 which was originally devised in 1930. This is essentially a laboratory method which for maximum accuracy requires very careful manipulation as well as very careful sampling and refrigeration of samples during storage. The test gives reliable results only if the involved procedural steps are carefully followed.

The actual manipulation time for a standard Reid test is approximately 15 minutes per sample but the total elapsed testing time, including chilling time, generally amounts to several hours. In the usual case where samples are drawn by operators, delivered to a technical service laboratory and there measured, the total elapsed time from the drawing of the sample to the reporting back by the laboratory generally is of the order of about four hours. Obviously in operations where large quantities of material are handled, the difference between control based on up-to-the-minute information and that based on information which is four hours late is satisfactory neither from the quality of product nor the economy of operations.

The standard Reid test provides reasonably accurate results but is subject to errors of manipulation and it is a comparatively slow procedure even when carried out by a highly skilled operator. Moreover, in ordinary blending operations as much as 5000 barrels of gasoline per hour may be produced during which the composition of the streams being blended may change materially, thus influencing the properties of the product. If the blending operator must wait a half hour or longer after any change in the operating conditions before he can determine the effect of the change on the product, he obviously may be unable to prevent the occurrence of substantial deviations from the prescribed range of vapor pressure during such time. Accordingly, at a subsequent check test the blended product will not meet specifications of vapor pressure and would be reblended.

Efforts have been made to devise equipment for measuring the so-called "true vapor pressure" of the gasoline by passing a side stream into an evaporating cup-type apparatus and measuring the pressure developed therein. However, such vapor pressure apparatus has not proved successful for the continuous recording of vapor pressure and control of blending operations. One difficulty which makes such prior technique unsatisfactory is that virtually all gasoline streams contain traces of dissolved or entrained non-condensable gases such as air and hydrocarbons which come out of solution and accumulate in the testing apparatus rendering the device unreliable and ultimately inoperative.

It is a primary object of the present invention to provide improvements in apparatus and method for continuously and automatically determining the vapor pressure of gasoline stocks of relatively narrow boiling range. Another object of the invention is to provide an improved continuous vapor pressure determining apparatus which is of simple and rugged construction and utilizes a minimum of mechanical elements. Still another object of the invention is to provide method and means for determining the vapor pressure of gasoline. An additional object of the invention is to provide a mechanical device for accurately measuring and recording the vapor pressure and means for the spontaneous and accurate control of blending hydrocarbon streams of different volatility to obtain a product stream of the desired vapor pressure characteristics. These and other objects of the invention will become apparent as the description thereof proceeds.

Briefly the present invention attains the above and other objects by providing a system for continuous vapor-pressure measurement which avoids these difficulties. The invention comprises a novel method and apparatus for determining the vapor pressure of gasolines wherein the vapor pressure is determined by measuring the temperature drop produced upon the expansion of the liquid under test from a high to a low pressure under relatively adiabatic conditions. This process depends upon the fact that, when a blended liquid-gasoline evaporates, heat is absorbed to produce a cooling effect. By maintaining the liquid at a selected temperature under pressure sufficient to prevent evaporation at that temperature, and then releasing the pressure by passage through an expansion valve, vaporization will occur and the extent of cooling produced will be proportional to the vapor pressure of the liquid mixture.

Experimentally it was found that gasolines of different compositions gave readings which depended only on their vapor pressures as shown in Table I.

*Table I*

| Gasoline | Reid Vapor Pressure | Per Cent 158 | Temperature Difference, °C. |
|---|---|---|---|
| A | 12.2 | 30 | 29.7 |
| B | 12.4 | 24 | 29.3 |

Apparatus employed in the determination of gasoline vapor pressure, according to the invention, is hereinafter described in greater detail in connection with the accompanying drawings wherein.

Figure 1:
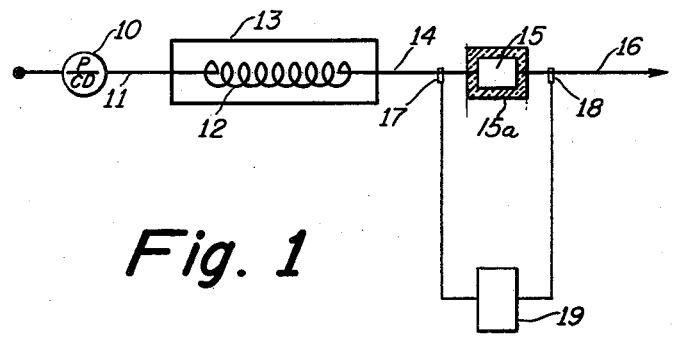
Figure 1 is a diagrammatic showing of the apparatus.

Referring to the drawing, a constant delivery pump 10 supplies the sample by feed line 11 to a heating coil 12 which is immersed within a constant temperature bath 13 in heat interchange relationship with the liquid therein, and the sample is here raised to a temperature which is below the boiling point of the sample under the pressure conditions obtaining within coil 12. The liquid sample then flows from the coil 12 via line 14 into an expansion valve 15, and finally is vented to waste via line 16. Thermocouples 17 and 18 on the inlet and outlet sides of the expansion valve 15 indicate the extent of cooling occurring within the expansion valve 15. The voltage outputs of thermocouples 17 and 18 are applied to a recording differential potentiometer 19 which indicates the temperature difference across the expansion valve 15. This differential can be calibrated in terms of difference in Reid vapor pressure of the sample.

Figure 3:
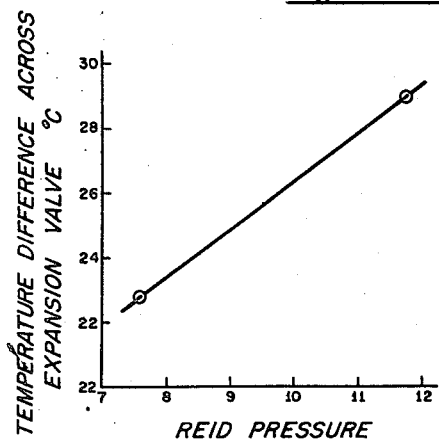
Figure 3 is a plot of correlated observed values obtained according to the invention.

Gasoline of known vapor pressure was introduced into the heating coil 12 at a constant rate where it was heated to a predetermined temperature and allowed to expand in valve 15. The cooling produced was determined from the thermocouple readings. The results of a flow rate of 50 cc. per minute, a preheater bath temperature of 80° C. and a pressure of 50 pounds before expansion are shown in Figure 3. It is apparent that 1° C. corresponds to a vapor pressure change of 1.5 pounds.

Figure 2:
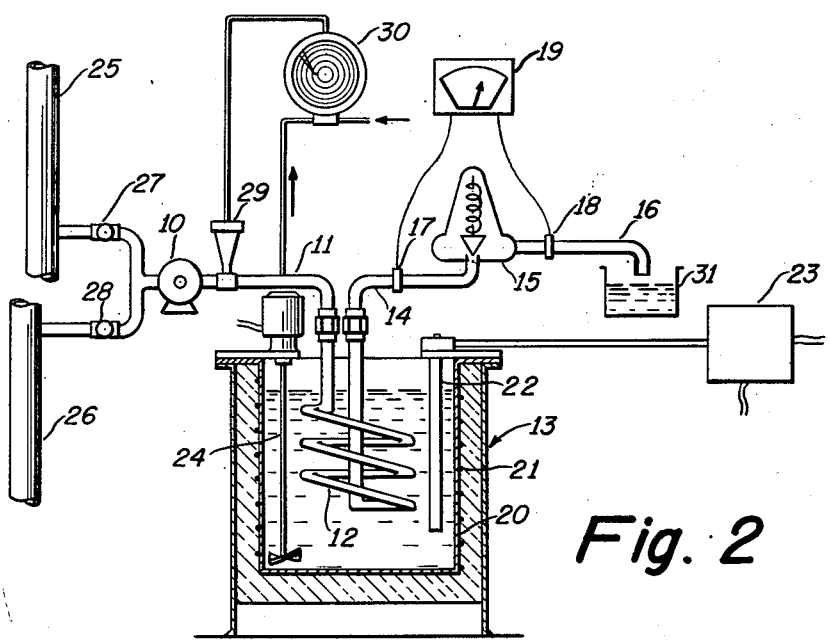
Figure 2 is a schematic representation showing the details of one installation.

The constant temperature bath 13 may comprise an insulated vessel 20 having electrical coil heater 21 wrapped about it as shown in Figure 2. The heat input to the heater 21 is controlled in order to maintain the bath 13 at constant temperature by means of thermocouple or cartridge thermal switch apparatus 22 that is also immersed in the bath and connected to a relay means 23 whereby current is intermittently supplied to the heater 21 in response to any temperature change in the bath. An agitating device or stirrer 24 may be used to provide more uniform circulation of the bath liquid and thus improve the temperature control. Other conventional means of obtaining constant temperature such as, for example, a thermostated copper block (not shown) can be employed in place of the illustrated constant temperature bath.

The preheated sample flows from coil 12 via conduit 14, which is preferably heat insulated, into the expansion valve or vaporizing chamber 15. The vaporizing chamber 15 may be maintained within an insulation 15a to permit substantially adiabatic boiling therein and discharges to the atmosphere by line 16. The inlet thermocouple 17 can be placed in conduit 14 and the outlet thermocouple 18 can be placed on the vent line 16 adjacent the expansion means 15. Calibration of the device can be made and checked at periodic intervals with a typical gasoline blend of known Reid vapor pressure.

In an example of operation of the vapor pressure apparatus shown in the drawing, the liquid gasoline sample is introduced into the feed line 11 under a positive pressure of about 50 p. s. i. by means of constant delivery pump 10 at a feed rate of about 2 gallons per hour. The heating coil 12 comprised about 30 feet of tubing having an inside diameter of 0.25 inch and was maintained at a temperature of about 80° C. by the bath 13. The recorder 19 used had a range of about 8 to 15 p. s. i. R. V. P. and it was found that deviations in the values for repeated tests on a given gasoline sample were less than when successive readings were made according to the standard Reid vapor pressure test. Thus the device, according to my invention, is both automatic and accurate. Data in Table II illustrate the results of the test.

*Table II*

| Gasoline | Temperature Difference, °C. | Vapor Pressure Read from Fig. 3. | Reid Vapor Pressure |
|---|---|---|---|
| C | 29.2 | 11.9 | 11.8 |
| C | 28.8 | 11.7 | 11.8 |
| D | 22.5 | 7.5 | 7.5 |
| D | 22.5 | 7.5 | 7.5 |

The apparatus described herein may be attached to a petroleum products pipe line and any change in the vapor pressure of the product being transported will be rapidly indicated on the temperature chart. The temperature differential responsive means including, for example, the thermocouples 17 and 18, and the differential potentiometer 19 can be connected so as to operate suitable relays and automatically control blending valves so that a product of desired vapor pressure characteristics can be produced. Similarly the apparatus may be used to log the flow of products through a given section of the pipe line.

Referring specifically to Figure 2 of the drawing, a feed line 25 is tapped by valved sample line 27. A second feed line 26 and valved sample line 28 can be manifolded to the apparatus, as shown, where it is desired to obtain vapor pressure data from more than one feed line for substantial periods but not necessarily continuously. A sample is withdrawn from the selected feed line through the associated sample line 27 or 28 and to the inlet of constant delivery pump 10. The sample then flows through a pressure regulator 29 having a gage 30 attached thereto. The sample then flows under controlled flow rate and pressure via line 11 into the heating coil 12 immersed in a constant temperature bath 13 in heat interchange relationship with the liquid therein and is raised to a temperature of about 80° C. which is below the boiling point of the sample under the pressure maintained on the coil prior to the expansion valve 15. The heated liquid sample then flows from the coil 12 via line 14, which is preferably heat insulated, into expansion chamber 15 where substantially adiabatic boiling occurs, and the fluid discharges to the atmosphere above a liquid receiver 31 through line 16. Thermocouples 17 and 18 on the inlet and outlet sides of the expansion valve 15 indicate the extent of cooling which has occurred in passage through the expansion valve 15. The voltage outputs of thermocouple 17 and 18 are applied to a recording differential potentiometer 19 which indicates the temperature difference which is correlated with the Reid vapor pressure of the sample.

The temperature-responsive means 19 can in turn be connected so as to operate suitable relays and automatically operate blending valves so that the storage tanks at a petroleum bulk station can be filled with the proper product automatically and in response to determination of the vapor pressure of the product. Similarly, the apparatus can be used to log the flow of products through a given section of a pipe line.

I have described an apparatus for differential temperature measurement calling for thermocouples on both sides of the expansion valve. It should be understood, however, that in some instances it will be desirable to maintain the preheating bath or block at the comparative temperature and merely measure the temperature of the self-cooling, expanded stream of gasoline. With such an arrangement a simple null-type potentiometer can be used for giving an indication of the drop in temperature as between the temperature of the bath and of the outlet from the expansion chamber. With such an assembly of apparatus the conduit 14 and the thermocouple 17 may be eliminated.

Another embodiment of the invention may comprise maintaining the liquid gasoline at the ambient temperature in the liquid state and expanding the liquid at a subatmospheric pressure sufficient to cause at least partial vaporization of the gasoline. This partial vaporization under reduced pressure would likewise result in a temperature decrease in the gasoline stream and this decrease can be measured by suitable resistance thermometer or thermocouple as an indication of the vapor pressure of the gasoline sample corrected for ordinary atmospheric pressure.

Although my invention has been described in terms of specific apparatus which is described in considerable detail, it should be understood that this is by way of illustration only and that the invention is not limited thereto. Alternative embodiments and operating techniques will become apparent to those skilled in the art in view of my disclosure. Accordingly, modifications in the method and means of my invention are contemplated without departing from the spirit of the described invention or from the scope of the appended claims.

I claim:

1. An apparatus for automatically determining the vapor pressure of blended gasoline which comprises in combination a constant delivery pump, a heating coil, a feed line from said pump to said heating coil, a constant temperature bath substantially surrounding said heating coil, a vaporizing chamber outside said bath, a conduit for discharging heated liquid from said coil into said chamber, and temperature differential measuring means adapted to determine the temperature drop across the vaporizing chamber.

2. An apparatus for continuously indicating the vapor pressure of a flowing stream of gasoline, the apparatus comprising in combination a conduit means into which the liquid is introduced at a uniform pressure and rate, means for elevating the temperature of the liquid in a portion of said conduit means, a chamber for substantially adiabatic vaporization of liquid from said conduit means, and temperature-responsive means controlled by the extent of vaporization within said chamber.

3. An apparatus for continuously determining the apparent vapor pressure of a blended gasoline which comprises in combination a feed line, means for elevating the temperature of the liquid while passing through a portion of the feed line, temperature-responsive means at the outlet of said feed line, a vaporization chamber into which said feed line discharges, a vent line from said vaporization chamber, a second temperature-responsive means at the outlet of said vaporization chamber, and temperature differential recording means calibrated in terms of pounds per square inch of Reid vapor pressure.

4. An apparatus for continuously obtaining and recording an indication of the vapor pressure of a flowing stream of gasoline comprising in combination heating coil means, means for maintaining said coil means at a pre-selected uniform temperature, means for permitting expansion of heated liquid from said coil means into a vaporization chamber, and means for determining a temperature drop across the inlet and outlet of said vaporization chamber.

5. An apparatus for determining vapor pressure of blended gasoline which comprises a constant displacement feed pump, a heating coil, a feed line between said pump and said coil, an expansion valve on the outlet of said heating coil, a thermocouple on the inlet side of said expansion valve, a second thermocouple on the outlet side of said expansion valve, and a recording differential potentiometer means connected to the outputs of said thermocouples, the said potentiometer being calibrated in terms of pounds per square inch of Reid vapor pressure.

6. An apparatus for obtaining an indication of the vapor pressure of a liquid which comprises in combination means for preheating said liquid, and adiabatic vaporization means, means for flowing said liquid through said preheating means and said adiabatic vaporization means in series, and means for determining the temperature drop through the adiabatic vaporization means as an indication of the vapor pressure of the liquid under test.

7. An apparatus for obtaining an indication of the vapor pressure of gasoline which comprises in combination a first conduit means maintained at a substantially uniform temperature, means for flowing liquid gasoline through said first conduit means, means for maintaining pressure on the liquid gasoline sufficient to prevent boiling within said first conduit means at said uniform temperature, a second conduit means including an insulated expansion valve in series with said first conduit means and having a portion maintained under substantially adiabatic conditions wherein adiabatic boiling occurs to cool the flowing liquid, and means for measuring the temperature drop due to the adiabatic boiling as an indication of the vapor pressure of the liquid gasoline under test.

8. An apparatus for determining the vapor pressure of a gasoline which comprises in combination means for introducing liquid gasoline at a constant pressure and uniform rate into the first of two succeeding flow means, means for maintaining the first of said flow means at a substantially constant temperature, substantially adiabatic vaporization means, conduit means for flowing the preheated liquid gasoline into said second flow means comprising an insulated vaporization means, means for determining the temperature of the liquid stream entering the said vaporization means, means for withdrawing gasoline vapors and liquid from said vaporization means, means for measuring the temperature of the stream entering the vaporization means, and means for determining the drop in temperature which occurs in said vaporization means as an indication of the vapor pressure of the gasoline.

9. An apparatus for determining the vapor pressure of a liquid hydrocarbon mixture of high and low boiling constituents wherein the low boiling constituents are of a narrow boiling range, which comprises a pre-heater, means for flowing a liquid mixture through said preheater, means for sensing the temperature in the exit of the preheater, expansion means for rapidly reducing the pressure on said liquid stream from said preheater to induce adiabatic boiling thereof and reduce the temperature of the stream, and means for measuring the drop in temperature of the liquid due to self-cooling on boiling as an indication of the vapor pressure of the hydrocarbon mixture.

10. An apparatus for obtaining an indication of the vapor pressure of a gasoline, including a minor proportion of mixed low-boiling hydrocarbons which comprises means for heating said gasoline in the liquid state to a preselected temperature, means for preventing boiling of the said gasoline during the heating thereof, an expansion flow means, means for introducing the heated gasoline into said expansion flow means wherein boiling of the heated liquid gasoline reduces the stream temperature, and means for measuring the drop in the temperature of liquid flow through said expansion flow means.

SIXT FREDERICK KAPFF.

References Cited in the file of this patent

UNITED STATES PATENTS

| Number | Name | Date |
|---|---|---|
| 1,945,660 | Scott | Feb. 6, 1934 |
| 2,002,101 | Valby | May 21, 1935 |
| 2,281,978 | Kibre | May 5, 1942 |
| 2,540,377 | Pachaly | Feb. 6, 1951 |
| 2,566,307 | Boyle | Sept. 4, 1951 |